(No Model.)
W. H. SINGLETON.
BALE TIE.
No. 530,607. Patented Dec. 11, 1894.
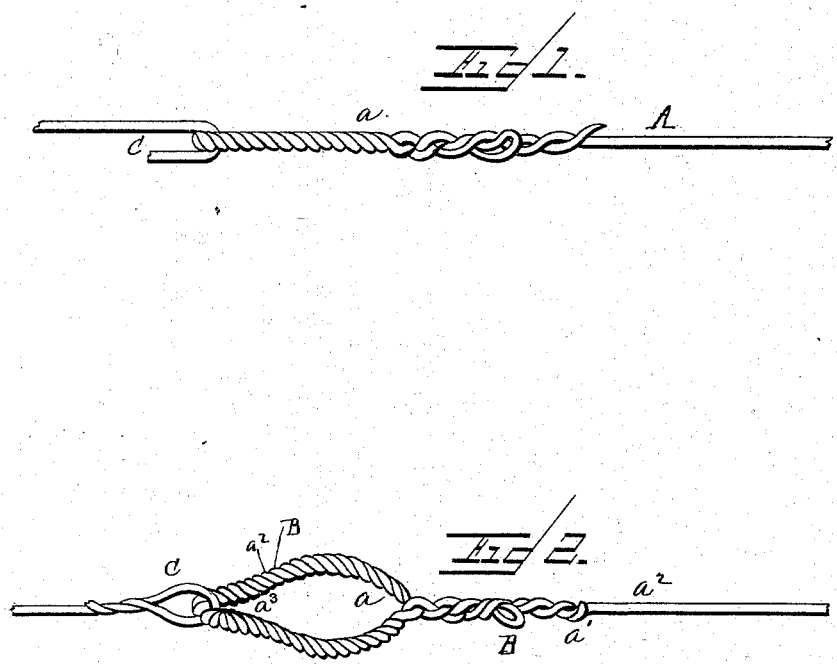
WITNESSES
F. L. Ourand
E. K. Stewart
INVENTOR
William H. Singleton

UNITED STATES PATENT OFFICE.

WILLIAM H. SINGLETON, OF WASHINGTON, DISTRICT OF COLUMBIA.

BALE-TIE.

SPECIFICATION forming part of Letters Patent No. 530,607, dated December 11, 1894.

Application filed February 10, 1892. Serial No. 421,019. (No model.)

*To all whom it may concern:*

Be it known that I, WILLIAM H. SINGLETON, a citizen of the United States, residing at Washington, District of Columbia, have invented certain new and useful Improvements in Bale-Ties; and I do hereby declare the following to be a full, clear, and exact description of the invention, such as will enable others skilled in the art to which it appertains to make and use the same.

This invention relates to an improvement in bale ties, more especially to that class styled "adjustable ties" which are adapted for use with bales or bundles of different sizes. In this class of ties the bale band is turned about the substance to be baled and one end is slipped into the other. The pressure being relieved, the two ends catch together. In such ties as now used the great aim is to have these parts quickly grip together so as to prevent one part from sliding on the other, for this sliding or slipping action tends to cause one part to cut or break the other.

The object of this invention is to produce a bale tie which will tend to minimize the slipping of the parts and on which the gripping will be done quickly.

To this end the invention consists in a bale tie, the catching part of which has a pinching angle and a surface having biting edges so that the other end of the tie will be caught therein and not slip, as will be explained.

Referring to the drawings: Figure 1 is a side view of such a bale tie, and Fig. 2 is a perspective.

In the drawings: the letter A indicates a bale tie having the catch, $a$. This catch is formed by twisting the end, $a'$, of the bale wire, $a^2$, back upon itself in the usual way, and at the same time intertwisting with it a separate piece of wire, B, so that the catch, $a$, is made of two wires twisted together as shown. Instead of a separate piece of wire, B, the end, $a'$, may be first twisted and then this twist turned upon itself and the end twisted around the bale band as shown in Fig. 1. This catch, $a$, is made with the usual pinching angle, $a^3$.

A bale band thus made has a clasp, the surface of which has biting edges. The two wires twisted together present several surfaces, instead of one, to the turned in end of the band wire, and these several surfaces bite against the band wire in the pinching angle.

In use the bale tie is turned about the bale, the end, C, is slipped through the catch, $a$, and the bale is released. As the end, C, slips into the pinching angle, $a^3$, it is caught by the roughened sides of the catch and the sliding of the parts upon each other is retarded. Before the end, C, reaches the extremity of the angle, it is pinched down into this angle, the sides of the catch, $a$, coming together. The end, C, is bitten between the two wires which form the twist of the catch, $a$, so that not only does the shape of the pinching angle bite the end, C, but the latter is also bitten or pinched in the smaller angle between the two wires of the twist.

I am aware that a bale tie has been patented in which the catch has been made of two wires twisted together; but this is not an "adjustable tie," and has no "pinching angle." The twisted end is simply turned through a loop and caught upon itself. There is no tendency for the end to slip in the catch as is the case in an "adjustable tie."

Having thus described my invention, what I claim is—

1. A bale tie, having a loop formed at one end, said loop having a pinching angle to receive the other end of the tie, and a roughened surface, as set forth.

2. A bale tie, having a loop formed at one end composed of several wires twisted together and having a pinching angle to receive the other end of the tie, such pinching angle having a roughened surface, as set forth.

In testimony whereof I affix my signature in presence of two witnesses.

WILLIAM H. SINGLETON.

Witnesses:
SAML. A. DRURY,
FRANCK L. OURAND.